United States Patent [19]

Morishita et al.

[11] Patent Number: 4,742,778
[45] Date of Patent: May 10, 1988

[54] FLOATING CARRIER TYPE TRANSPORTING SYSTEM

[75] Inventors: Mimpei Morishita, Fuchu; Teruo Azukuzawa, Tokyo, both of Japan

[73] Assignee: Kabushiki Kaisha Toshiba, Kawasaki, Japan

[21] Appl. No.: 843,278

[22] Filed: Mar. 24, 1986

[30] Foreign Application Priority Data

Mar. 25, 1985 [JP] Japan ................................. 60-58186

[51] Int. Cl.⁴ ..................... B61B 13/08; B60L 13/06; B60L 13/10
[52] U.S. Cl. .................... 104/284; 104/291; 104/293
[58] Field of Search ............... 104/281, 284, 286, 290, 104/291, 292, 293, 294; 238/382

[56] References Cited

U.S. PATENT DOCUMENTS

| | | | |
|---|---|---|---|
| 3,834,316 | 9/1974 | Hennings | 104/291 |
| 3,851,594 | 12/1974 | Schwärzler | 104/281 |
| 3,871,301 | 3/1975 | Kolm et al. | 104/284 |
| 3,937,148 | 2/1976 | Simpson | 104/284 |
| 4,075,948 | 2/1978 | Minovitch | 104/281 |
| 4,203,546 | 3/1980 | Raquet et al. | 238/382 |
| 4,259,908 | 4/1981 | Feistkorn et al. | 104/281 |
| 4,307,668 | 12/1981 | Vinson | 104/281 |
| 4,395,165 | 7/1983 | DeRobertis et al. | 406/88 |
| 4,454,820 | 6/1984 | Raschbichler | 104/281 |

FOREIGN PATENT DOCUMENTS

| | | | |
|---|---|---|---|
| 37313 | 9/1975 | Japan | 104/281 |
| 53313 | 10/1975 | Japan | 104/281 |

Primary Examiner—Dennis H. Pedder
Attorney, Agent, or Firm—Foley & Lardner, Schwartz, Jeffrey, Schwaab, Mack, Blumenthal & Evans

[57] ABSTRACT

A floating carrier type transporting system comprises guide rails whose bottom section is formed by a ferromagnetic material, a carrier free to run along the guide rails, a magnetic supporting device for floating the carrier, a linear induction motor for drining the carrier that is floated by the magnetic supporting device to run along the guide rails, a sensor unit for detecting the changes in magnetic reluctance and/or magnetomotive force in the magnetic circuit that is mounted on the carrier, a control device for controlling the excitation current that is to be flowed in the electromagnet based on the output from the sensor unit, and a roll damping device for damping the rolling that is generated in the carrier in the state of running under the action of the magnetic supporting device and the linear induction motor.

12 Claims, 5 Drawing Sheets

FLOATING CARRIER TYPE TRANSPORTING SYSTEM

BACKGROUND OF THE INVENTION

1. Field of the Invention

The present invention relates to a floating carrier type transporting system for transporting small articles, and more particularly, to a floating carrier type transporting system which enables savings in energy and space.

2. Description of the Prior Art

In recent years, it has been common to transport slips, documents, cash, data, and others among a plurality of locations in a building by means of a transporting system as a part of office automation or factory automation.

For such purposes, in particular for a transporting system to be employed in clean rooms, the system is required to be one which is capable of moving articles to be transported quickly and quietly. For this reason, for a transporting system of this kind, there is often employed a method in which the carrier is supported on guide rails in noncontacting manner. Now, the use of pneumatic or magnetic means is in general use for noncontacting support of the carrier. Among other systems, the method of magnetically supporting the carrier may be considered to be the most promising supporting means in view of its superiority in the ability of following the guide rails and the noise reduction effect.

Now, the existing floating carrier type transporting system is one in which the carrier is supported stably by controlling the exciting current to the electromagnets. However, this has to lead to the drawback of consuming a large amount of power due to the necessity for constantly energizing the coils of the electromagnets. With this in mind, some systems have been proposed which attempt to reduce the power consumption by arranging to provide the majority of magnetomotive force required by the electromagnets by means of the permanent magnets. However, even in such a case, when an external force is applied sideways to the carrier due, for example, to its passing in a curved section of the guiding rails, there will be generated a rolling in the carrier. Since the carrier is being floated, however, convergence of the rolling motion in the carrier is poor, and the variations in the attractive forces of the permanent magnets have to be controlled by virtue of the attractive forces of the electromagnets. Any increase in the power consumption by the electromagnets in this situation is a matter of concern. Moreover, with the an increase in the power to be provided to the electromagnets because of the application of a lateral external force to the carrier, it becomes necessary to employ a power source with a large capacity as the power source for energizing the electromagnets, leading eventually to a system as a whole which has to be made large.

SUMMARY OF THE INVENTION

An object of the present invention is to provide a floating carrier type transporting system which enables one to save energy and space.

Another object of the present invention is to provide a floating carrier type transporting system which is capable of quickly damping roll in the carrier which is in a floated state, as well as of markedly reducing the amount of power consumption due to rolling.

A floating carrier type transporting system in accordance with the present invention includes guide rails whose bottom section, at least, is made of a ferromagnetic material, a carrier which is arranged freely movably along the guide rails, a magnetic supporting device equipped with a single or a plurality of electromagnets which are attached to the carrier so as to face, via gaps, the bottom surface of the guide rails, and with permanent magnets that are attached to the carrier and are arranged in each of the magnetic circuits formed by an electromagnet, a guide rail and a gap, in order to supply magnetomotive force required to keep floating the carrier, sensor units attached to the carrier for detecting the magnetic reluctance or, additionally, variations in the magnetomotive force of the magnetic circuit, a control device which has a control unit that controls the exciting current flowing in the electromagnet based on the output of the sensor unit, and a power source consisting of battery units for supplying necessary power to each of the electromagnets and the control device. In a floating carrier type transporting system described as above, a special feature of the present invention consists in the fact that it is equipped with a damping device for roll which has a kinetic energy to thermal energy converting mechanism that consists of a weight that is swingable at least in the guiding direction of the carrier and a container that has a spring, an elastic body, or a sloped surface that supports the weight.

The roll damping device may also be constructed by providing a dynamically frictional part for some member of the carrier. Also, it may be constructed by attaching the device on the carrier side via a dash-pot, or further, it may be constructed by soaking the weight in a fluid. Still further, it may be constructed by the use of a part or the entirety of the power source in place of the weight.

Namely, a weight which is supported by a panel, an elastic body such as rubber, or a sloped surface, may be attached to the carrier. The rolling which is generated in the carrier due to a lateral external force applied to the carrier is shifted to a rolling in the weight by means of a resonance phenomenon. With this, the kinetic energy of rolling in the weight is arranged to be absorbed by a spring or an elastic body as the energy that is consumed in its deformation. Absorption of the kinetic energy may also be accomplished as the dynamic friction generated between the weight and the sloped surface, the dynamic friction generated between other members of the carrier and the weight, the spring, or the elastic body, or the viscous resistance generated when the above-mentioned parts are immersed in a fluid, or still further, by the use of a dash-pot.

These and other objects, features and advantages of the present invention will be more apparent from the following description of a preferred embodiment taken in conjunction with the accompanying drawings.

DESCRIPTION OF THE PREFERRED EMBODIMENT

Figure 1:
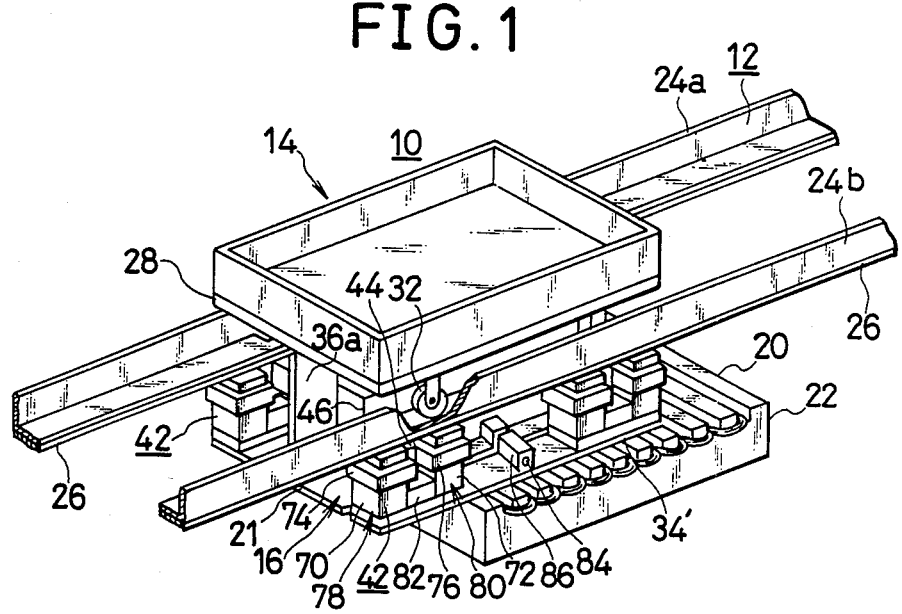
FIG. 1 is a simplified perspective view of a floating carrier type transporting system in accordance with the present invention.
Figure 2:
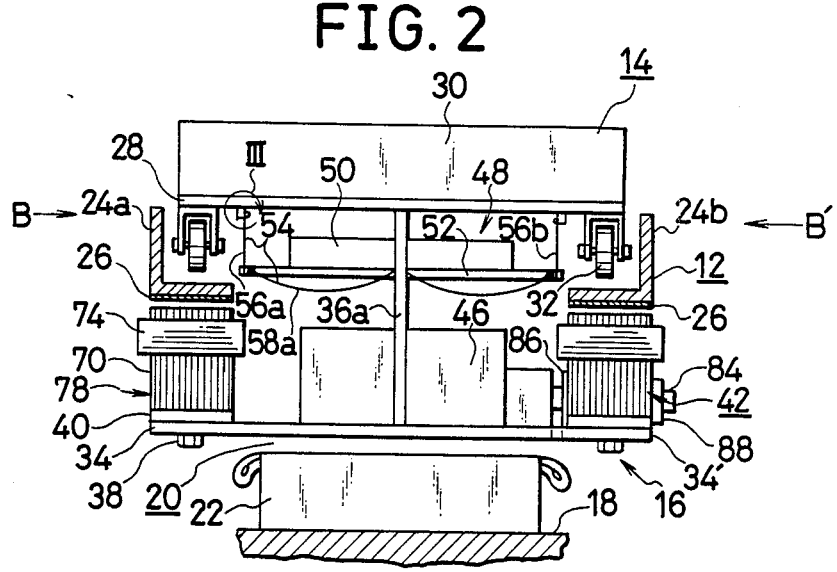
FIG. 2 is a front view of the floating carrier type transporting system shown in FIG. 1.
Figure 5:
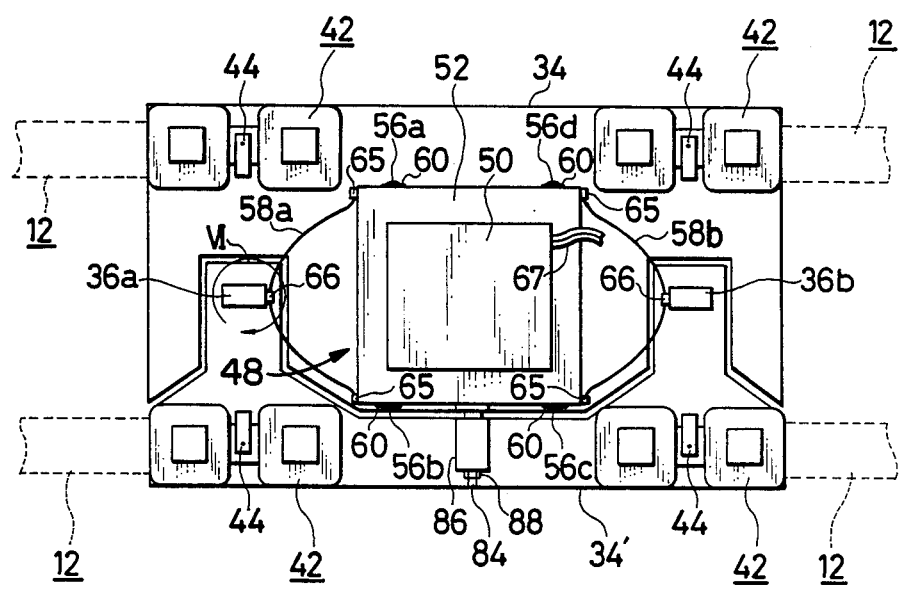
FIG. 5 is a cross-sectional view along B-B' of FIG. 2.
Figure 6:
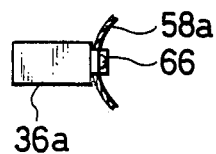
FIG. 6 is an enlarged view of the attached section of the roll damping device as indicated by the circle VI in the floating carrier type transporting system shown in FIG. 5.
Figure 7:
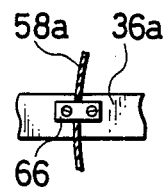
FIG. 7 is a front view of the attached section shown in FIG. 6.
Figure 8:
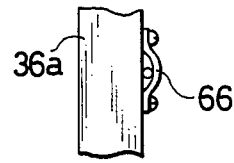
FIG. 8 is a side view of the attached section shown in FIG. 6.

Referring to FIGS. 1, 2, and 5, a floating carrier type transporting system embodying the present invention is shown by reference numeral 10.

As shown, the floating carrier type transporting system 10 includes guide rails 12 whose bottom portion, at least, is made of a ferromagnetic material and a carriage 14 which is arranged to be freely movable along guide rails 12. Mounted on the bottom part of the carrier 14 is a magnetic supporting device 16. Also, on the base portion 18 along the guide rails 12, there is arranged at a fixed distance a stator 22 of a linear induction motor 20.

The guide rails 12 are constructed by laying angular members 24a and 24b parallel to each other and by adhering white vinyl tapes 26 on the bottom surface of the angular members 24a and 24b. The vinyl tape 26 is given a frosting treatment, for example, in order to enhance irregular reflection from the surface.

The carrier 14 is constructed with a plate-like support plate 28, a flat container 30 placed over the support plate 28 for facilitating the transportation of articles to be transported such as documents, and four wheels 32 attached at four corner positions on the lower surface of the support plate 28 for supporting the support plate 28 in such time as emergency.

Further, the magnetic supporting device 16 comprises trucks 34 and 34' that face the bottom surface of the support plate 28 via the guide rails 12, two linking plates 36a and 36b that are arranged perpendicular to the support plate 28 and link the support plate 28 and the trucks 34 and 34', and four magnetic supporting units 42 that are mounted on the four corner positions of the trucks 34 and 34' using the bolts 38 and the seats 40, to face the bottom surface of the guide rails 12 and to be freely rotatable in a horizontal plane. To each of these magnetic supporting units 42 there is fixed an optical gap sensor 44 for detecting the length of the gap between the magnetic supporting unit 42 and the guide rail 12. At the control area of the truck 34' there is mounted a control device 46, and on the bottom surface of the support plate 28 there is fixed a roll damping device 48. Further, the roll damping device 48 includes a power source 50 of the magnetic supporting device 16 as one of its components.

Figure 3:
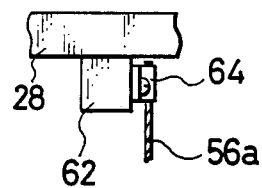
FIG. 3 is an enlarged view of the attached section of the roll damping device as indicated by the circle III in the floating carrier type transporting system shown in FIG. 2.
Figure 4:
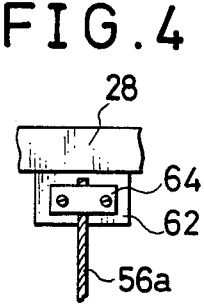
FIG. 4 is a front view of the attached section shown in FIG. 3.
Figure 9:
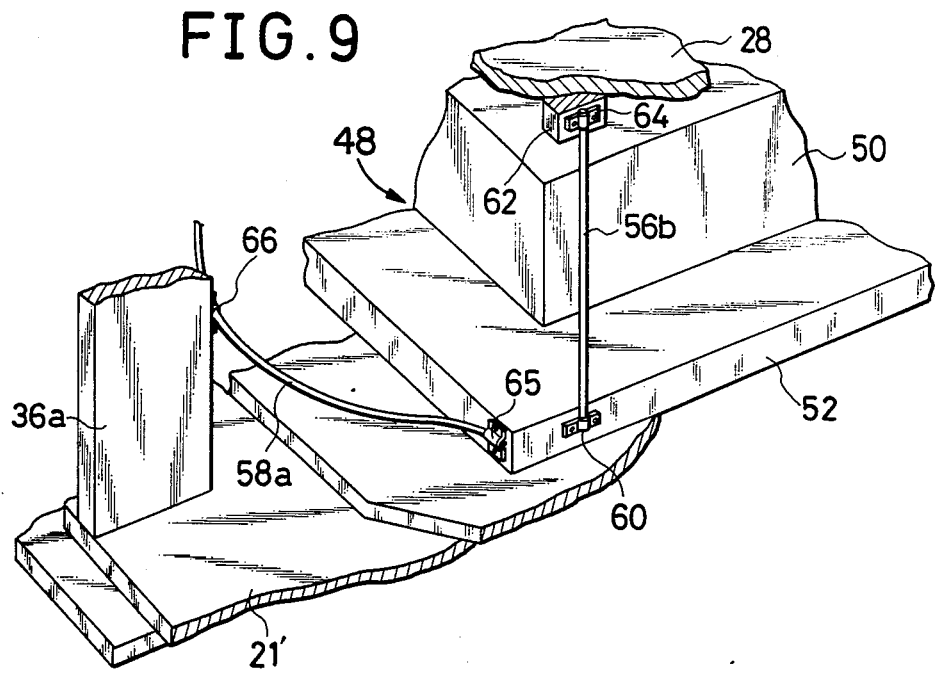
FIG. 9 is a perspective view of the attached section of the roll damping device in the floating carrier type transporting system shown in FIG. 2.

As shown in FIGS. 5 and 9, the roll damping device 48 includes a power source 50 that consists of battery units, a frame 52 on which is placed the power source 50, and an elastic connecting mechanism that connects the frame 52 and the magnetic supporting device 16. The elastic connecting mechanism includes four wires 56a, 56b, 56c, and 56d that connect the four corners of the frame 52 and the support plate 28 so as to keep the frame 52 positioned below the support plate 28, and two elastic members 58a and 58b that connect both sides of the frame 52 and the linking plates 36a and 36b. Namely, as shown in FIG. 9, one end of each of the wires 56 is attached with a clasp 60 to the edge section of the frame 52, and, as shown in FIGS. 3 and 4 the other end is attached with a clasp 64 to a fastening plate 62 which is fixed to the bottom surface of the support plate 28. Accordingly, the frame 52 which has the power source 50 placed on it, is free to swing in the lateral direction in a state of hanging by the wires 56. As shown in FIG. 9, each of the elastic members 58 is connected with a clasp 65 to the respective edge sections of the frame 52 and, as shown by FIGS. 6, 7, 8, and 9, and its mid section is fixed to the linking plate 36 with a clasp 66.

Further, a lead wire 67 extends with a given slack from the power source 50 to the control device 46.

Figure 10:
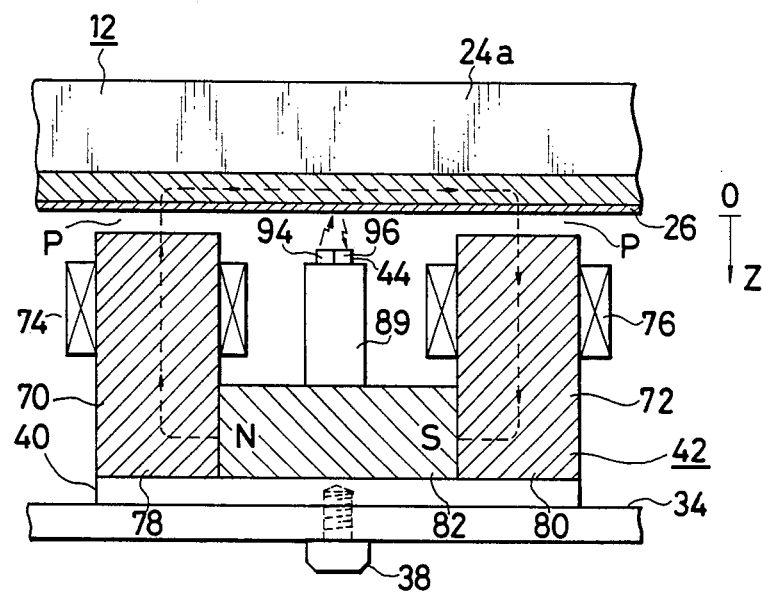
FIG. 10 is a cross-sectional view for illustrating the magnetic supporting unit and its peripheral parts in the floating carrier type transporting system shown in FIG. 1.

The magnetic supporting unit 42 is composed, as shown also in FIG. 10, of two yokes 70 and 72 whose top end surfaces face with gaps P in between the bottom surface of the guide rail 12, two electromagnets 78 and 80 formed by winding excitation coils 74 and 76 on the yokes 70 and 72, and a permanent magnet 82 that is placed between the lower side surfaces of the yokes 70 and 72, forming a shape of a letter U as a whole. The excitation coils 74 and 76 are connected in series with the sense in which the magnetic fluxes formed by the electromagnets 78 and 80 adds up mutually.

Further, trucks 34 and 34' are linked in a state in which they are rotatable in a vertical plane that is parallel to the traveling direction of the carrier 14, by means of a shaft 84 fixed to the truck 34, a bearing 86 fixed to the truck 34', and a slip stopper 88.

Next, the control device for zero-power controlling the excitation current to be supplied to the electromagnets 78 and 80 of the magnetic supporting unit 42 will be described.

First, the magnetic circuit formed by the guide rail 12, the gap P, the yokes 70 and 72, and the permanent magnet 82 of the magnetic supporting unit constructed as above will be considered. Here, the magnetic flux leaking from the magnetic circuit will be neglected for simplicity. The magnetic reluctance Rm of the magnetic circuit will be represented by $$R_m = \frac{1}{\mu_o S}\left(2z + \frac{1}{\mu_S}\right). \tag{1}$$

In the above formula, $\mu_o$ is the permeability of the vacuum, S is the cross-section of the magnetic circuit, z is the gap length, $\mu_S$ is the relative permeability of the part other than the gap section, and l is the length of the magnetic circuit excluding the gap section.

Next, the total magnetic flux $\phi$ generated in the magnetic circuit is given by $$\phi = (NI + H_m l_m)/R_m, \quad (2)$$

where $H_m$ is the intensity of a magnetic field generated in the gap P when there is no excitation current flowing in the coils 74 and 76, $l_m$ is the length of the permanent magnet 82, N is the total number of turns of the coils 74 and 76, and I is the excitation current to the coils 74 and 76. Accordingly, the total attractive force F acting between the guide rail 12 and each of the yokes 70 and 72 can be represented by $$F = -S(\phi/S)^2/\mu_o \quad (3)$$
$$= \frac{(NI + H_m l_m)^2}{\mu_o R_m^2 S}.$$

Then, by representing the direction of the gravity by that of z, the equation of motion of the carrier is given by $$m \frac{d^2z}{dt^2} = -\frac{(NI + H_m l_m)^2}{\mu_o R_m^2 S} + mg + U_m. \quad (4)$$

Here, m is the total mass of the load applied to the magnetic supporting unit and the magnetic supporting unit itself, g is the acceleration of gravity, and $U_m$ is the magnitude of the external force that is applied to the carrier.

On the other hand, the number $\phi_N$ of flux lines linking with the coils 74 and 76 that are connected in series is given by $$\phi_N = (NI + H_m l_m)N/R_m \quad (5)$$

so that, by denoting the total resistance of the coils 74 and 76 by R, and the applied voltage by E, the voltage equation for the coils 74 and 76 is given by $$\frac{d\phi_N}{dt} = E - RI$$

which can further be rearranged as $$\frac{\partial \phi_N}{\partial I} \cdot \frac{dI}{dt} + \frac{\partial \phi_N}{\partial z} \cdot \frac{dz}{dt} = E - RI$$

or $$\frac{N^2}{R_m} \cdot \frac{dI}{dt} - \frac{2N}{\mu_o S R_m^2}(NI + H_m l_m) \cdot \frac{dz}{dt} = E - RI$$

and hence $$\therefore \frac{N^2}{R_m} \cdot \frac{dI}{dt} + RI = \frac{2N}{\mu_o S R_m^2}(NI + H_m l_m) \cdot \frac{dz}{dt} + E \quad (6)$$

It should be noted that use has been made in the above of the fact that $R_m$ is a function of the gap length z, as may be seen from Eq. (1). Now, by calling the gap length that corresponds under I=0 to the situation in which the attractive force F and the gravity force mg are in equilibrium as $z_o$, and the corresponding total magnetic reluctance $R_{mo}$, Eqs. (3) and (6) above will be linearized in the neighborhood of gap length $z=z_o$, velocity (dz/dt)=0, and current I=0.

In that case, z, (dz/dt), and I can be represented by $$z = z_o + \Delta z,$$

$$(dz/dt) = 0 + \Delta \dot{z},$$

$$I = 0 + \Delta i,$$

where $\Delta z$, $\Delta \dot{z}$, and $\Delta i$ are the respective infinitesimal quantities.

Now, linearizing eq. (3) which represents the attractive force F in the neighborhood of the stationary point $(z, (dz/dt), I) = (z_o, 0, 0)$, one obtains $$F = (F)_{(z_o,0,0)} + \left(\frac{\partial F}{\partial z}\right)_{(z_o,0,0)} \Delta z + \left(\frac{\partial F}{\partial I}\right)_{(z_o,0,0)} \Delta i$$

$$= -\frac{\mu_o S H_m^2 l_m^2}{\left(2z_o + \frac{l}{\mu s}\right)^2} + \frac{4\mu_o S H_m^2 l_m^2}{\left(2z_o + \frac{l}{\mu s}\right)^3} \Delta z -$$

$$\frac{2\mu_o S H_m l_m N}{\left(2z_o + \frac{l}{\mu s}\right)^2} \Delta i.$$

By setting $$F_o = \frac{\mu_o S H_m^2 l_m^2}{\left(2z_o + \frac{l}{\mu s}\right)^2} = mg,$$

the above equation may be rewritten as $$F = -mg + \frac{4 mg}{R_{mo}} \Delta z - \frac{2N mg}{H_m l_m} \Delta i.$$

Therefore, Eq. (4) may be rearranged to give $$\Delta \ddot{z} = \frac{4g}{\mu_o R_{mo} S} \Delta z - \frac{2gN}{H_m l_m} \Delta i + \frac{1}{m} U_m. \quad (7)$$

Similarly, by linearizing Eq. (6) in the neighborhood of $(z, (dz/dt), I) = (z_o, 0, 0)$, there will be obtained $$\Delta i = \frac{2 H_m l_m}{N\mu_o R_{mo}S} \Delta \dot{z} - \frac{R (H_m l_m)^2}{N^2 mg \ \mu_o R_{mo}S} \Delta I + \frac{(H_m l_m)^2}{N^2 mg \ \mu_o R_{mo}S} E.$$

Equations (7) and (8) in the above may be incorporated into the following equation of state.

$$\frac{d}{dt}\begin{pmatrix} \Delta z \\ \Delta \dot{z} \\ \Delta i \end{pmatrix} = \begin{pmatrix} 0 & 1 & 0 \\ a_{21} & 0 & a_{23} \\ 0 & a_{32} & a_{33} \end{pmatrix}\begin{pmatrix} \Delta z \\ \Delta \dot{z} \\ \Delta i \end{pmatrix} + \begin{pmatrix} 0 \\ 0 \\ b_{31} \end{pmatrix} E + \begin{pmatrix} 0 \\ d_{21} \\ 0 \end{pmatrix} U_m,$$

where $a_{21}$, $a_{23}$, $a_{32}$, $a_{33}$, $b_{31}$ and $d_{21}$ are given respectively by $$a_{21} = \frac{4g}{\mu_o R_{mo}S}, \quad a_{23} = -\frac{2gN}{H_m l_m}, \quad a_{32} = \frac{2 H_m l_m}{N\mu_o R_{mo}S},$$

-continued $$a_{33} = -\frac{R(H_m l_m)^2}{N^2 mg\, \mu_o R_{mo} S}, \quad b_{31} = \frac{(H_m l_m)^2}{N^2 mg\, \mu_o R_{mo} S}, \quad d_{21} = \frac{1}{m},$$

Equation (9) in the above may be represented for simplicity by $$\dot{X} = AX + BE + DU_m. \tag{10}$$

The linear system represented by Eq. (9) is in general an unstable system. However, by determining the applied voltage E by means of various methods based on the state vector $(\Delta z, \Delta \dot{z}, \Delta i)^T$ and the acceleration $\Delta \ddot{z}$, and giving a feedback control to the system, it becomes possible to realize stabilization of the system. For instance, if the output matrix is represented by C (a unit matrix in this case) and the applied voltage is expressed by $$\begin{aligned} E &= -(F_1, F_2, F_3) \times C \times X \\ &= -FCx \end{aligned} \tag{11}$$

(where $F_1$, $F_2$, and $F_3$ are the feedback constants), Eq. (10) becomes $$\dot{x} = Ax - BFCx + DU_m, \tag{12}$$

and x may be determined as $$x = L^{-1}\{[sI - A + BFC]^{-1}(X_o + DU_m(s))\} \tag{13}$$

by Laplace transforming Eq. (12). In the above equation, I is the unit matrix and $x_o$ is the initial value of x.

When $U_m$ in Eq. (13) is a step-form external force, stability of x can be assured if all of the characteristic roots of the determinant, $\det |\phi(s)|$, of the state transition matrix $\phi(s)$, namely, $$\phi(s) = (SI - A + BFC)^{-1} \tag{14}$$

are found in the left half of the complex plane for the variable s. For Eq. (9), the characteristic equation for $\phi(s)$, namely, $\det |\phi(s)| = 0$, is given by $$s^3 + (b_{31} F_3 - a_{23}) s^2 + \{-a_{21} + a_{23}(b_{31} F_2 - a_{32})\}s + \tag{15}$$

$$a_{23} b_{31} F_1 - a_{21}(b_{31} F_3 - a_{33}) = 0.$$

Therefore, by appropriately choosing the values of $F_1$, $F_2$ and $F_3$, it is possible to determine at will the configuration of the characteristic roots of $\det |\phi(s)| = 0$ in the complex plane, and accomplish the stability of the magnetic floating system. In a magnetic floating system in which such a feedback control is applied to its magnetic supporting unit, in response to the step-form external force Um and the changes in the bias voltage $e_o$ of the applied voltage E, there will be generated stationary deviations $\Delta z_s$ and $\Delta i_s$ in the gap length deviation z and the current deviation for the stationary state of the system $\Delta i$, as given below.

$$\Delta z_s = \frac{-d_{21}(-a_{22} + b_{31} F_3) U_m - b_{31} a_{23} e_o}{a_{21}\left(-a_{32} + b_{31} F_3 - \frac{a_{23}}{a_{21}} b_{31} F_1\right)}, \tag{16}$$

$$\Delta i_s = \frac{d_{21} b_{31} F_1 U_m + b_{31} a_{21} e_o}{a_{21}\left(-a_{32} + b_{31} F_3 - \frac{a_{23}}{a_{21}} b_{31} F_1\right)}. \tag{17}$$

Figure 12:
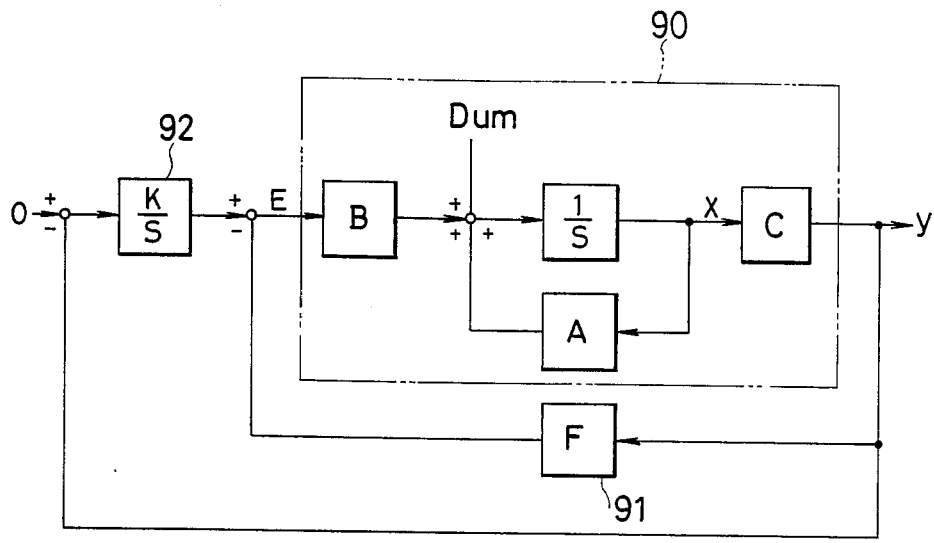
FIG. 12 is a block diagram for illustrating the control method of the magnetic supporting unit shown in FIG. 10.

The zero-power control device is a device which applies a feedback control to the magnetic supporting unit so as to produce a vanishing stationary current deviation $\Delta i_s$, out of the stationary deviations represented by Eqs. (16) and (17), irrespective of presence or absence of the step-form external form Um. Namely, as shown in FIG. 12, a control system of the zero-power control device integrates the current deviation, $\Delta i_s$ by means of an integral compensator, and feeds back the output of the compensator with an appropriate gain incorporated to the magnetic floating system. Therefore, the device consists of a control object 90 supplemented by a feedback gain compensator 91 and an integral compensator 92. The gain K of the integral compensator 92 is a matrix represented by $K = (0, 0, K_3)$ where $K_3$ is the integral gain of the current deviation $\Delta i$. Accordingly, the applied voltage E to the magnetic floating system may be represented by $$E = -FC \times -KC \int_0^t \times dt. \tag{18}$$

The state transition matrix $\phi(s)$ determined similar to the previous case is given by $$\phi(s) = (s^2 I - sA + sBFC + BKC)^{-1}. \tag{19}$$

The transfer function $G(s) = s\phi(s)E$ for the case of the external force Um as an input and y defined by $y = C_x$ as an output can be given by $$G(s) = \frac{1}{\Delta(s)} \begin{pmatrix} \{s^2 + (b_{31} F_3 - a_{33})s + b_{31} K_3\} d_{21} \\ \{s^2 + (b_{31} F_3 - a_{33})s + b_{31} K_3\}s\, d_{21} - \\ \{(b_{31} F_2 - a_{32})s + b_{31} F_1\}s\, d_{21} \end{pmatrix} \tag{20}$$

where $$\Delta(s) = s^4 + (b_{31}F_3 - a_{22})s^3 + \{b_{31}K_3 - a_{21} + a_{23}(b_{31}F_2 - a_{32})\}s^2 + \{a_{23}b_{31}F_1 - a_{21}(b_{31}F_3 - a_{33})\}s - a_{21}b_{31}K_3. \tag{21}$$

The characteristic roots of the transfer function G(s) can be determined by setting $\Delta(s) = 0$ in terms of $\Delta(s)$ given by Eq. (21), and hence it is possible to realize the stability of the magnetic floating system shown in FIG. 12 by selecting appropriately the values of $F_1$, $F_2$, $F_3$, and $K_3$.

Here, assuming that the magnetic floating system of the figure is stable, the response of the deviation current $\Delta i$ to the external force Um can be determined as follows by the use of Laplace transformation.

$$\Delta i(s) = -\frac{d_{21}}{\Delta(s)} \{(b_{31} F_2 - a_{32})s + b_{31} F_1\}s\, U_m(s). \tag{22}$$

Since the external force Um is a step-form external force, if the magnitude of the external force is called $F_o$, then there follows $Um(s) = F_o/s$, so that Eq. (21) becomes $$\Delta i(s) = -\frac{d_{21}}{\Delta(s)} \{(b_{31} F_2 - a_{32})s + b_{31} F_1\} F_o. \tag{23}$$

Since Eq. (23) guarantees $$\lim_{t \to \infty} \Delta_i \to 0,$$

it is clear eventually that means for causing the stationary current deviation $\Delta i_s$ tend to zero, regardless of presence or absence of the external force Um, does actually exist.

Here, as the methods for detecting the elements of the state vector x there may be mentioned the following For instance,
1. The method of directly measuring individual elements of the vector by the use of a suitable sensor.
2. The method of determining $\Delta z$, $\Delta \dot{z}$, and others from the output of either one of suitable gap sensor, velocity sensor, or acceleration sensor, by integrating it using an integrator or by differentiating it using a differentiator as need may arise.
3. The method of detecting two elements of the state vector by method 1 or 2 above and measuring the remaining element, along with the external force as needed, by a state monitor.

Figure 11:
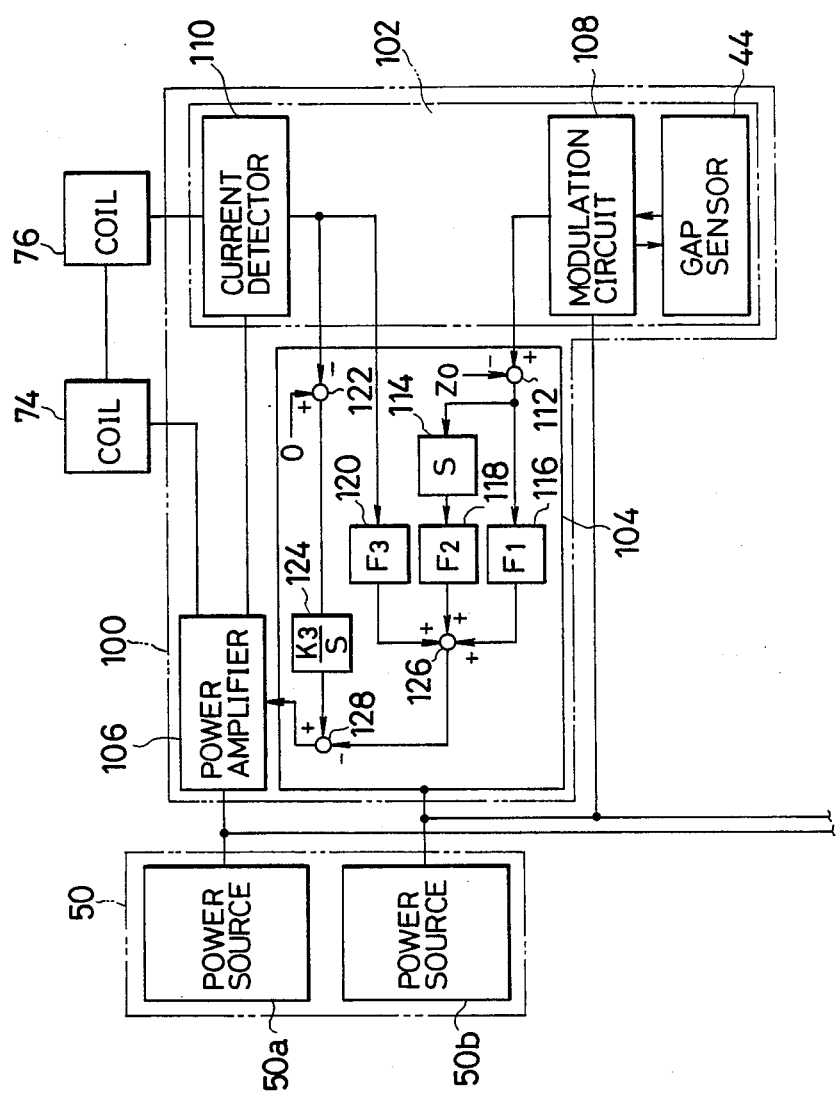
FIG. 11 is a block diagram illustrating the floating carrier type transporting system as shown by FIG. 1.

Referring now to FIG. 11, there is shown a zero-power control device with reference numeral 100. In the figure, the line with an arrow indicates a signal path and a solid line indicates a power path. The control device 100 is for realizing an example of the control methods that is illustrated in FIG. 12. In more concrete terms, it consists of an operational circuit 104 for computing the power to be supplied to the coils 74 and 76 based on the signals from a sensor unit 102 that detects the changes in the magnetic circuit formed by the magnetic supporting unit that is mounted on the carrier 14, and a power amplifier 106 for supplying power to the coils 74 and 76 based on the signals from the operational circuit 104. The sensor unit 102 consists of the gap sensor 44 that detects the gap length that exists between each magnetic supporting unit 42 and the guide rail 12, a modulation circuit 108 for pre-processing the signals from the gap sensor 44, and a current detector 110 for detecting the current value in the coils 74 and 76. The optical gap sensor 44 is fixed via a supporting member 90 to the magnetic supporting unit 42. For the optical gap sensor 44 use may be made, for example, of a reflective photo-coupler, and the gap length is detected by measuring the variations in the intensity of the light which is emitted from a light-emitting element 92 toward the vinyl tape 26 on the bottom surface of the guide rail 12, and which is reflected from the vinyl tape 26 and is detected by a light-receiving element 94.

The vinyl tape 26 is provided for reducing irregular reflections from the surface to be measured by the gap sensor 44. Provision of the vinyl tape 26 markedly stabilizes the output of the gap sensor 44 even if there are flaws and spots on the surface to be measured. The operational circuit 104 on the one hand receives the signals from the gap sensor 44 via a modulation circuit 108, subtracts $z_o$ from it in a subtractor 112, and introduces the output of the subtractor 112 directly and via a differentiator 114 to the feedback gain compensators 116 and 118, respectively. On the other hand, the operational circuit 104 leads the signal from the current detector 110 a feedback gain compensator 120. Further, the operational circuit 104 compares in a subtractor 128 the signal which is compensated for by an integral compensator 124 after being introduced from the current detector 110 and compared with the zero signal in a subtractor 122, with the output summed in an adder 126 of the outputs from the three feedback gain compensators 116 through 120, and the deviation found in the comparison is output to the power amplifier 106.

It should be noted that the power source 50 for supplying power separately to the power amplifier system and the operational circuit system is used to serve as a weight in the roll damping device 48, as was mentioned earlier, and consists of two power source units 50a and 50b. These power source units 50a and 50b supply power also to separate magnetic supporting units.

Next, the operation of the floating carrier type transporting system constructed as above in accordance with the present invention will be described.

Namely, the magnetic flux created in the magnetic supporting unit 42 by the permanent magnet 82 forms a magnetic circuit by passing through the yokes 70 and 72, the gap, and the ferromagnetic portion of the guide rail 12. The magnetic circuit is arranged, in the stationary state in which no external forces are applied to the carrier 14, to maintain a predetermined gap length $z_o$ so as to produce a magnetic attractive force that does not require a magnetic flux due to the electromagnets 78 and 80.

When an external force Um is applied in this state, it is detected by the gap sensor 44, and the detected signal is sent out to the operational circuit 104 via the modulation circuit 108. In the operational circuit 104, the set value $z_o$ of the gap length is subtracted in the subtractor 114 from the above signal, to compute the signal for gap deviation $\Delta z$. The signal for the gap deviation $\Delta z$ is input to the feedback gain compensator 116, and is input also to the feedback gain compensator 118 after it is converted to a signal for the velocity deviation $\Delta z$ by the differentiator 114. On the other hand, the signal for the current deviation $\Delta i$ is obtained from the signal measured by the current detector 110, and is input to the feedback gain compensator 120. Further, the signal for the current deviation $\Delta i$ is compared with the zero signal in the subtractor 122, and the difference signal is input to the integral compensator 124. Then, the sum of the outputs of the three feedback gain compensators 116 through 120 added in an adder 126, and the signal from the integral compensator 124, are assigned predetermined respective gains and are fed back to the power amplifier 106. In this manner, the system will be stabilized in a state in which the current deviation $\Delta i$ equals zero.

Accordingly, in the coils 74 and 76, current flows only in a transient state that appears when variations are generated in the magnetic circuit, due to application of an external force to the carrier 14, and the current in the stationary state will be zero regardless of the presence or absence of an external force. This makes it possible to reduce the burden on the power source to a marked degree and to realize energy savings and space savings.

Now, when the stator 22 of the linear induction motor is energized in the situation in which the carrier 14 is situated above the stator 22, the truck 34 receives an electromagnetic force from the stator 22. Therefore, the carrier 14 begins to run along the guide rails 12 in the state in which the carrier 14 is floated magnetically. If the stator 22 is properly situated before the carrier 14 is brought to a complete stop under the influence of the air resistance of other factors, then the carrier 14 is energized again to maintain the motion along the guide rails 12. This motion will be continued until the carrier 14 reaches the desired destination. In this way, it becomes possible to move the carrier 14 to the destination in a noncontacting state.

Moreover, even if there exist curved sections with small radii of curvature in its way to the destination, the carrier 14 can follow the guide rails 12 by means of the magnetic force while the magnetic supporting unit rotates in a horizontal plane. Furthermore, when there is given a cant to the curved section, it becomes possible to run the carrier 14 at high speed by absorbing the twist of the plane formed by the guide rails 12 due to the canting, through rotation of the trucks 34 and 34' in a vertical plane.

Now, for the carrier 14 in the state of floatation during run or at rest, the magnetic supporting units 42 generate attractive force in the guide rails 12, which supports and guides the carrier 14. However, there is given no control to the magnetic supporting units 42 in the guiding direction, that is, in the lateral direction, so that the magnetic supporting units 42 have no active means of consuming the kinetic energy of rolling which is caused in the carrier 14 by the lateral external force that is applied due to loading and unloading of the cargo, passage of a curved section, and so forth. Consequently, if none of the measures is taken to damp the rolling in the carrier 14, changes in the attractive force of the permanent magnet during the period of rolling have to be controlled by the excitation of the electromagnets. This leads to a circumstance that the power consumed by the electromagnets during the period has to be increased, and eventually to be necessity of employing a power source with a large capacity.

Moreover, when a rolling starts to appear in the carrier 14, there will be generated a mismatch between the magnetic supporting unit 42 and the bottom surface of the guide rail 12 that faces the magnetic supporting unit 42, and it will result in a proportionate reduction in the effective cross-sectional area of the magnetic path in the gap P, and a weakening in the attractive force. However, when the carrier 14 is floated magnetically by means of the zero-power control, as in the present embodiment, the control device 100 controls the electromagnets 78 and 80 so as to preserve the state of magnetic floatation by narrowing the gap P, in order to compensate for the weakening in the attractive force. Therefore, a pendulum motion will be induced in the carrier 14, with the floated position for the case when there is no rolling as the lowest point of the pendulum motion. On the other hand, in the conventional magnetic floating control where there is applied no zero-power control, the reduction in the attractive force is compensated for by an increase in the coil current due to a lengthening in the gap length. Therefore, an inverted pendulum motion will be induced in the carrier 14 with the floated position of the carrier 14 when there is no rolling as the highest point in the pendulum motion.

Figure 13:
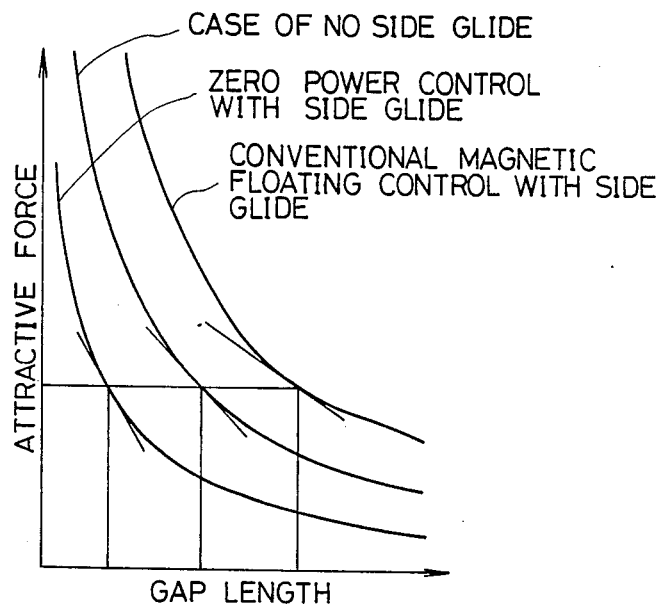
FIG. 13 is a graph showing the relationship between the attractive force and the gap length that corresponds to the rolling in the magnetic supporting unit.

Fundamentally, in the magnetic floating system employing the zero-power control method, when the magnetic supporting unit 42 is glided sideways by a distance less than the width of the yokes 70 and 72 underneath the bottom surface of the guide rail 12, the rate of change in the attractive force to the gap length at the point where equal attractive force is generated is steeper in comparison to the case of no side glide, neglecting the magnetic saturation of the yokes 70 and 72, as shown by FIG. 13.

In contrast to this, in the case of conventional magnetic floating control, equal attractive force is attained at a gap length P which is larger compared with the case of no side glide so that the rate of change in the attractive force becomes more moderate than in the latter case.

For that reason, in the conventional magnetic floating control, it is possible to stabilize the up and down motion that accompanies the rolling, without change to the feedback gain for the case of no side glide, and to realize a state of magnetic floatation in which the rolling will not diverge.

However, in the zero-power control, stabilization of the up and down motion accompanying the rolling may not be expected unless there is given an increase in the feedback gain for the case of no side glide, which make it difficult to realize a state of magnetic floatation with no divergence.

However, if the feedback gain is increased in the actual circuit, not only the operational elements are liable to be saturated and hence makes satisfactory control difficult to be realized, but also causes the noise generated in the circuit by the high gain to be amplified at the same time. This results in a pulse in the attractive force of the electromagnets 78 and 80 which generates a vibration in the guide rails 12, and may very well cause noise generation or resonance in the rails.

Now, in the present embodiment, the roll damping device 48 consisting of the frame 52, elastic connecting mechanism 54, and power source 50 is mounted on the carrier 14. Consequently, rolling which is generated in the carrier 14 is transmitted to the power source by the resonance phenomenon, converted to heat by the deformation in the elastic members 58a and 58b of the elastic connecting mechanism 54 that accompanies the resonance, and is dissipated quickly. Moreover, the damping device 48 requires none of the power so that is is possible to save the energy of the power source.

In addition, according to the present embodiment, rolling of the carrier 14 can quickly be suppressed so that it is possible to reduce markedly the increase in the power consumption due to rolling, as described in the above. Moreover, it permits the transportation of cargo items that detest rolling. Therefore, it becomes possible to enlarge substantially the range of application of the floated carrier type transportation system in accordance with the present invention.

Moreover, the present invention is not limited to the above embodiment. Thus, for example, in the above embodiment, as the weight for the roll damping device, use is made of the power source. However, it limits by no means the nature of the weight, and it may be replaced by another member of the carriage or by a weight which is prepared exclusively for that purpose.

Furthermore, in the above embodiment, an elastic body is employed for supporting the weight. However, this by no means limits the supporting member of the weight so that a spring, a dash-pot, or other means may be used instead, or it may be supported by a concave inclined surface or a V-shaped inclined surface. Further, in order to enhance the conversion of the kinetic energy of rolling to heat energy, it may be arranged to let the weight or other supporting member to slide against another member, or arrange these components to be immersed in a fluid. In short, what is needed is to construct a roll damping device which realizes a quick conversion of the kinetic energy of rolling to heat energy. In particular, if a part or the entirety of the members that constitute the carrier is employed as a component of the roll damping device, it enables one to reduce the total weight when the roll damping device is mounted on the carrier. In addition, it permits one to increase the carrying capacity of the carrier.

In addition, according to the present embodiment, the roll damping device is mounted at the lower section of the support plate of the carrier. However, it by no means limits the mounting position of the roll damping device, and it may be mounted at any position so long as it can give full play of its function.

As in the above, various modifications to the present invention will become possible without departing from the essentials of the present invention.

What is claimed is:

1. A floated carrier type transporting system for transporting items to be transported, comprising:
   (a) guide rails whose bottom section is formed by a ferromagnetic material;
   (b) a carrier which is arranged to run freely along said rails;
   (c) a magnetic supporting device for floating said carrier, said magnetic supporting device comprising at least one electromagnet mounted on said carrier so as to face the bottom surface of said guide rails via a gap, and a permanent magnet which is mounted on said carrier so as to be arranged in the magnetic circuit including the electromagnet, said guide rails, and the gap, in order to supply magnetomotive force needed for floating said carrier;
   (d) a linear induction motor for causing said carrier which is floated by said magnetic supporting device to be guided and run along said guide rails;
   (e) a sensor unit for detecting changes in magnetic reluctance and/or magnetomotive force in said magnetic circuit mounted on said carrier; and
   (f) a control device for controlling excitation current to be flowed in the electromagnets for said magnetic supporting device, based on the output of said sensor unit;
   (g) a roll damping device for damping the rolling which is generated in the carrier that is in a running condition caused by the action of said magnetic supporting device and said linear induction motor,
   (h) said roll damping device comprises, at least, weight means that is mounted swingably relative to said carrier, said weight means comprising a power source for supplying power to each electromagnet of said magnetic supporting device, and a mechanical kinetic energy to heat energy conversion mechanism that includes an elastic connection mechanism that supports said weight means with elasticity.

2. A floating carrier type transporting system as claimed in claim 1, in which the mechanical kinetic energy to heat energy conversion mechanism is constructed so as to damp quickly the rolling of the carrier that is transmitted to the power source by resonance phenomenon, by converting it to heat through elastic deformation in the elastic connection mechanism.

3. A floating carrier type transporting system is claimed in claim 1, in which said rolling damping device further comprises a frame for placing the weight means over it, and the elastic connection mechanism comprises wires for connecting the frame and said carrier so as to keep the frame below said carrier and elastic members for elastically connecting the frame to said carrier.

4. A floating carrier type transporting system as claimed in claim 1, in which said control device controls the excitation current that flows in said electromagnetic such that a stationary value of the excitation current in the electromagnet is maintained, regardless of the presence or absence of an external force that is applied to said carrier.

5. A floating carrier type transporting system as claimed in claim 4, in which said control device comprises a state monitor for observing the magnitude of the external force from the output value of said sensor unit, and means for feeding back the magnitude of the external force observed by the state monitor to the electromagnet by assigning to it a predetermined gain.

6. A floating carrier type transporting system as claimed in claim 4, in which said control device comprises means for feeding back to said excitation current, the values of deviations, including deviations which are amplified in a gap length between the electromagnet and said guide rails, a velocity of the carrier in the direction of the gap length, and the excitation current in the electromagnet, and respective predetermined gains that do not vanish simultaneously, via a filter that has a first order transfer function.

7. A floating carrier type transporting system as claimed in claim 4, in which said control device comprises an integral compensator for integrating a deviation in the excitation current by assigning a predetermined gain, and means for feeding back the output value of an integral compensator to the excitation current.

8. A floating carrier type transporting system as claimed in claim 1, in which said carrier is constructed by a planar support plate, a flat container placed on the support plate for transporting articles to be transported, and four wheels that are attached to four corner positions on the bottom surface of the support plate for supporting the support plate in an emergency or the like.

9. A floating carrier type transporting system as claimed in claim 8, in which said magnetic supporting device comprises a truck that faces the bottom surface of the support plate via the guide rails, two linking plates that are arranged perpendicular to the support plate for linking the support plate and the truck and four magnetic supporting units that are mounted with bolts and seats on four corner positions of said truck to face the bottom surface of said guide rails, so as to be rotatable in a horizontal plane, and the magnetic supporting unit comprising two yokes whose top end surface faces the bottom surface via a predetermined gap P, two electromagnets consisting of excitation coils that are wound around the yokes, and a permanent magnet that is placed between the lower side surfaces of said yokes.

10. A floated carrier type transporting system for transporting items to be transported, comprising:
   (a) guide rails whose bottom section is formed by a ferromagnetic material;
   (b) a carrier which is arranged to run freely along said rails, the carrier comprising a planar support plate, a flat container placed on the support plate for transporting articles to be transported and four wheels attached to four corner positions on a bottom surface of the support plate;
   (c) a magnetic supporting device for floating said carrier, said magnetic supporting device comprising at least one electromagnet mounted on said carrier so as to face the bottom surface of said guide rails via a gap, and a permanent magnet which is mounted on said carrier so as to be arranged in the magnetic circuit including the electromagnet, said guide rails, and the gap, in order to supply magnetomotive force needed for floating said carrier, the magnetic supporting device also comprising a truck facing the bottom surface of the support plate via the guide rails, two linking plates arranged perpendicular to the support plate for linking the support plate and the truck and four magnetic supporting units mounted by bolts on seats on four corner positions of the truck so as to face the bottom surface of the guide rails, and so as to be rotatable in a horizontal plane, each magnetic supporting unit comprising two yokes whose top end surface faces the bottom surface via a predetermined gap P, two electromagnets consisting of excitation coils wound around the yokes and a permanent magnet placed between lower side surfaces of the yokes;

(d) a linear induction motor for causing said carrier which is floated by said magnetic supporting device to be guided and run along said guide rails;

(e) a sensor unit for detecting changes in magnetic reluctance and/or magnetomotive force in said magnetic circuit mounted on said carrier;

(f) a control device for controlling excitation current to be flowed in the electromagnets for said magnetic supporting device, based on the output of said sensor unit;

(g) a roll damping device for damping in the rolling which is generated in the carrier that is in a running condition caused by the action of said magnetic supporting device and said linear induction motor; and (h) said roll damping device comprises, at least, weight means that is mounted swingably relative to said carrier, and a mechanical kinetic energy to heat energy conversion mechanism that includes an elastic connection mechanism that supports said weight means with elasticity.

11. A floating carrier type transporting system as claimed in claim 10, in which said sensor unit comprises gap sensors that are provided for each of the magnetic supporting devices for detecting the gap length between each magnetic supporting unit and the guide rail, modulation circuits for pre-processing the signals from the gap sensors, and current detectors for detecting the current values in said coils.

12. A floating carrier type transporting system as claimed in claim 11, in which said linear induction motor comprises a stator that is arranged along said guide rail and the truck of said magnetic supporting device.

* * * * *